United States Patent
Sano et al.

(10) Patent No.: US 8,535,588 B2
(45) Date of Patent: Sep. 17, 2013

(54) SHEET OR FILM OBLIQUE STRETCHING METHOD AND SHEET OR FILM CLIPPING STRETCHER

(75) Inventors: Takayoshi Sano, Fuji (JP); Satoru Nitta, Numazu (JP); Hiromu Saijyo, Sunto-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 430 days.

(21) Appl. No.: 12/374,270

(22) PCT Filed: Jul. 17, 2007

(86) PCT No.: PCT/JP2007/064067
§ 371 (c)(1),
(2), (4) Date: Apr. 6, 2009

(87) PCT Pub. No.: WO2008/010480
PCT Pub. Date: Jan. 24, 2008

(65) Prior Publication Data
US 2009/0261503 A1    Oct. 22, 2009

(30) Foreign Application Priority Data

Jul. 19, 2006  (JP) .................................. 2006-196861

(51) Int. Cl.
*D06C 3/02*    (2006.01)
(52) U.S. Cl.
USPC ........................................... 264/288.4; 26/73
(58) Field of Classification Search
USPC .......................................... 264/288.4; 26/73
See application file for complete search history.

(56) References Cited

U.S. PATENT DOCUMENTS

| | | | |
|---|---|---|---|
| 2,923,966 | A | 2/1960 | Tooke, Jr. et al. |
| 3,195,177 | A | 7/1965 | Kawamura et al. |
| 3,256,558 | A | 6/1966 | Heinz-Erhardt Andersen et al. |
| 3,276,071 | A | 10/1966 | Kazunori et al. |
| 3,305,889 | A | 2/1967 | Lewis et al. |
| 3,391,421 | A | 7/1968 | D'Onofrio et al. |
| 3,427,684 | A | 2/1969 | Tsien |
| 3,491,402 | A | 1/1970 | Koyama et al. |
| 3,611,479 | A | 10/1971 | Wicksall |
| 3,890,421 | A | 6/1975 | Habozit |
| 3,916,491 | A | 11/1975 | Kampf |
| 4,055,697 | A | 10/1977 | Schmanski |

(Continued)

FOREIGN PATENT DOCUMENTS

| | | |
|---|---|---|
| DE | 22 38 357 C3 | 6/1981 |
| JP | 44-7155 | 3/1969 |

(Continued)

OTHER PUBLICATIONS

Office Action issued in JP 2007-012473 on Oct. 26, 2010.

(Continued)

*Primary Examiner* — Galen Hauth
(74) *Attorney, Agent, or Firm* — DLA Piper LLP (US)

(57) ABSTRACT

Clipping both right and left side edge parts of a sheet or film by right and left pitch-variable clips having flow-directional clip pitches variable along with travel movements, respectively, having positions (AR, AL) for initiation of enlargements of flow-directional clip pitches changed between right clips and left clips, and enlarging flow-directional clip pitches along with travel movements of clips to thereby make an oblique stretch.

6 Claims, 9 Drawing Sheets

(56) References Cited

U.S. PATENT DOCUMENTS

| | | | |
|---|---|---|---|
| 4,330,499 | A | 5/1982 | Von und zu Aufsess et al. |
| 4,614,011 | A | 9/1986 | Nicholas et al. |
| 4,637,103 | A | 1/1987 | Hutzenlaub |
| 4,807,336 | A * | 2/1989 | Yoshimura et al. ............... 26/73 |
| 4,890,365 | A | 1/1990 | Langer |
| 5,081,750 | A | 1/1992 | Molz |
| 5,161,674 | A | 11/1992 | Rutz et al. |
| 5,265,313 | A | 11/1993 | Rutz |
| 5,394,595 | A | 3/1995 | Rutz |
| 5,402,556 | A | 4/1995 | Rutz |
| 5,613,284 | A | 3/1997 | Hosmer |
| 5,970,589 | A | 10/1999 | Hayashi et al. |
| 6,124,043 | A | 9/2000 | Tsukamoto |
| 6,168,840 | B1 | 1/2001 | Johnstone |
| 6,746,633 | B2 | 6/2004 | Sakamaki et al. |
| 7,771,826 | B2 | 8/2010 | Okano et al. |
| 7,828,997 | B2 | 11/2010 | Otoshi |
| 2004/0052937 | A1* | 3/2004 | Ito et al. ....................... 427/162 |
| 2004/0166348 | A1 | 8/2004 | Taghavi |
| 2006/0008642 | A1 | 1/2006 | Marot |
| 2006/0078754 | A1 | 4/2006 | Murakami et al. |
| 2006/0082022 | A1 | 4/2006 | Denker et al. |
| 2006/0115610 | A1 | 6/2006 | Nagashima |
| 2007/0084542 | A1 | 4/2007 | Montagna |
| 2007/0188686 | A1 | 8/2007 | Yano |
| 2007/0281112 | A1 | 12/2007 | Shi et al. |
| 2009/0123828 | A1 | 5/2009 | Kono |
| 2009/0176037 | A1 | 7/2009 | Otoshi et al. |
| 2010/0013121 | A1 | 1/2010 | Hashimoto et al. |
| 2010/0113653 | A1 | 5/2010 | Ueda |

FOREIGN PATENT DOCUMENTS

| | | |
|---|---|---|
| JP | 59-049939 | 3/1984 |
| JP | 59-067017 | 4/1984 |
| JP | 61-058723 | 3/1986 |
| JP | 63-042839 | 2/1988 |
| JP | 64-53177 | 3/1989 |
| JP | 2-113920 | 2/1990 |
| JP | 04-128028 | 4/1992 |
| JP | 2000-009912 | 1/2000 |
| JP | 2002-022944 | 1/2002 |
| JP | 2002-086554 | 3/2002 |
| JP | 2003-103626 | 4/2003 |
| JP | 2003-236927 | 8/2003 |
| JP | 2004-009542 | 1/2004 |
| JP | 2004-122640 | 4/2004 |
| JP | 2004-195712 | 7/2004 |
| JP | 2004-325561 | 11/2004 |
| JP | 2005-035131 | 2/2005 |
| JP | 2006-159775 | 6/2006 |
| JP | 2006-205409 | 8/2006 |
| JP | 2008-044339 | 2/2008 |
| TW | 550163 | 9/2003 |
| WO | WO 2006-129685 | 12/2006 |
| WO | WO 2007/034972 | 3/2007 |
| WO | WO 2008/038616 | 4/2008 |

OTHER PUBLICATIONS

English Translation of Japanese Office Action issued in JP 2007-012473 on Oct. 26, 2010.
English Abstract of JP 04-128028 published Apr. 28, 1992.
English Abstract of JP 63-042839 published Feb. 24, 1988.
Office Action issued in CN 200780027246.6 on Aug. 12, 2010.
English Translation of Office Action issued in CN 200780027246.6 on Aug. 12, 2010.
Office Action issued in German Appl 11 2008 000 240.1-16 on Oct. 5, 2010.
English Translation of Office Action issued in German Appl 11 2008 000 240.1-16 on Oct. 5, 2010.
English Abstract of JP 2008-044339 published Feb. 28, 2008.
English Translation of JP 2008-044339 published Feb. 28, 2008.
International Search Report of PCT/JP2007/064067.
English Language translation of JP-2002-022944.
English Language translation of JP-2004-009542.
English Language translation of JP-2005-035131.
English Language translation of JP-2002-086554.
English Language translation of JP-2004-325561.
English abstract of JP-2002-022944.
English abstract of JP-2004-009542.
English abstract of JP-2005-035131.
English abstract of JP-2002-086554.
English abstract JP-2004-325561.
International Search Report of PCT/JP2007/064066.
Machine English Language translation of JP-2003-236927.
English abstract of JP 2003-236927.
Machine English Language translation of JP-2004-122640.
English abstract of JP 2004-122640.
English abstract of JP-61-058723.
English abstract of JP-59-049939.
English abstract of JP-59-067017.
Taiwanese Office Action issued in Application No. 96126405 mailed Dec. 3, 2008.
English Abstract of Taiwanese Office Action issued in Application No. 96126405 mailed Dec. 3, 2008.
English abstract of JP-64-053177.
English abstract of JP-2003-103626.
English language translation of JP-2003-103626.
German Office Action issued in DE Appl 11 2007 001 696.5-16 on Jun. 4, 2010.
English Translation of German Office Action issued in DE Appl 11 2007 001 696.5-16 on Jun. 4, 2010.
German Office Action issued in DE Appl 11 2007 001 690.6-16 on Jun. 4, 2010.
English Translation of German Office Action issued in DE Appl 11 2007 001 690.6-16 on Jun. 4, 2010.
Taiwan Office Action issued in TW 96126407 on Jul. 13, 2010.
English Translation of Taiwan Office Action issued in TW 96126407 on Jul. 13, 2010.
Korean Office Action issued in KR Appl 10 2009 7001033 published on Jul. 20, 2010.
English Translation of Korean Office Action issued in KR Appl 10 2009 7001033 published on Jul. 20, 2010.
English Abstract of JP 2000 009912 published Jan. 14, 2000.
English Translation of JP 2000-009912 published Jan. 14, 2000.
English Abstract of JP 2006-159775 published Jun. 22, 2006.
English Translation of JP 2006-159775 published Jun. 22, 2006.
English Abstract of TW 550163 published Sep. 1, 2003.
English Abstract of JP 2004-195712 published Jul. 15, 2004.
English Translation of JP 2004-195712 published Jul. 15, 2004.
U.S. Appl. No. 12/524,111.
U.S. Appl 12/777,693.
English Abstract of JP 2-113920 published Apr. 26, 1990.
Search Report of International Application No. PCT/JP2008/050507 issued Apr. 8, 2008.
Machine English language translation of JP-2006-205409 published Aug. 10, 2006.
English language Abstract of JP-2006-205409 published Aug. 10, 2006.
English language Abstract of Japanese Patent Post-Examined Publication No. 44-07155 published Mar. 1969.
Korean Office Action issued in 10-2009-7015492 on Apr. 15, 2011.
English Language Translation of Korean Office Action issued in 10-2009-7015492 on Apr. 15, 2011.
U.S. Appl. No. 12/777,693.
German Office Action issued in DE 11 2007 001 696.5 on Jul. 11, 2011.
English Language Translation of German Office Action issued in DE 11 2007 001 696.5 on Jul. 11, 2011.
Japanese Office Action issued in JP 2006-196861 on Jul. 12, 2011.
English Language Translation of Japanese Office Action issued in JP 2006-19861 on Jul. 12, 2011.
Chinese Office Action issued in CN 200780027256.X on Jun. 9, 2011.
English Language Translation of Chinese Office Action issued in CN 200780027256.X on Jun. 9, 2011.

Office Action issued in U.S. Appl. No. 12/524,111, mailed Aug. 31, 2011.
U.S. Appl. No. 12/417,751.
German Office Action issued on Aug. 31, 2011 in DE 11 2007 001 690.6.
English Language Translation of German Office Action issued on Aug. 31, 2011 in DE 11 2007 001 690.6.
U.S. Appl. No. 12/374,260.

Office Action issued in TW 097102008 mailed May 23, 2011.
English Translation of Office Action issued in TW 097102008 mailed May 23, 2011.
Office Action issued in on 200880002918.2 mailed on May 18, 2011.
English Translation of Office Action issued in CN 200880002918.2 mailed on May 18, 2011.

\* cited by examiner

SHEET OR FILM OBLIQUE STRETCHING METHOD AND SHEET OR FILM CLIPPING STRETCHER

TECHNICAL FIELD

The present invention relates to a sheet or film oblique stretching method and a sheet or film clipping stretcher, and particularly, to a sheet or film oblique stretching method and a sheet or film clipping stretcher that are employable for fabrication of optical sheets or films with oblique orientation, such as a polarization film or phase difference film.

BACKGROUND ART

There are techniques employing, for production with good yield such as of a polarization film or phase difference film having an orientation axis tilted at 45 degrees, a sheet or film clipping stretcher adapted to grip right and left sides edges of a polymer film (as sheet or film) by pluralities of clips, respectively, moving those clips in a longitudinal direction of the polymer film, giving tensile forces to the polymer film in an oblique direction to implement an oblique stretch.

For oblique stretch by a sheet or film clipping stretcher having even clip pitches, it is necessary to provide clips on one side with a delay (one-sided delay) identical in dimension to a stretch exit width of clips on the other side, between sheet or film grip and release positions of clips, to provide a sheet or film with a stretch component in an oblique direction tilted relative to a travel direction of the sheet or film.

In this respect, there are sheet or film clipping stretchers disclosed in patent documents 1 and 2, where they provide clip travel locus lengths between sheet or film grip and release positions of clips, with a difference between right clip and left clip to give a one-sided delay. Further, there is a sheet or film clipping stretcher disclosed in patent document 3, where it provides a difference between travel speed of right clip and travel speed of left clip to give a one-sided delay.

Patent document 1: Japanese Patent Application Laid-Open Publication No. 2002-86554
Patent document 2: Japanese Patent Application Laid-Open Publication No. 2004-325561
Patent document 3: Japanese Patent Application Laid-Open Publication No. 2002-22944

DISCLOSURE OF INVENTION

In the sheet or film clipping stretchers disclosed in patent documents 1 and 2, there are variations caused in orientation in a transverse direction (as TD direction) of sheet or film due to the difference between right and left clip travel locus lengths, in addition to uneven variations in distance between right and left opposing clips, constituting a difficulty of stable production, of high-quality oblique stretched sheet or film.

Further, in the sheet or film clipping stretcher disclosed in patent document 1, there is an angle of 45 degrees provided between stretch inlet and stretch outlet constituting a disadvantage in equipment layout. Further, upon fine adjustment of tilt angle, it is required to change not simply angles of the stretcher, but also layouts of upstream and downstream associated equipments of the stretcher.

Further, in the sheet or film clipping stretcher disclosed in patent document 3, it is needed to make a grip of (clip on) sheet or film by clips, simultaneously starting a stretch, and release (clip off) sheet or film from the grip by clips, simultaneously with a completion of stretch, in addition to that upon clip-on and clip-off, travel speeds of clips are different between right and left, causing sheet or film grips to be uneven between right and left, actually constituting a difficulty of stable production. Further, magnification ratios in a flow direction (as MD direction) become different between right and left.

It is an object of the present invention to solve the problems described, allowing for implementation of a stable production of high-quality oblique stretched sheet or film.

According to a first aspect of the present invention, a sheet or film oblique stretching method comprises clipping moving-directionally right and left side edge parts of a sheet or film by first and second clip arrays composed of pitch-variable clips having clip pitches in a moving direction of the sheet or film variable along with travel movements thereof, having, with respect to the moving direction of the sheet or film, a position for the first clip array to initiate enlargement of clip pitch thereof changed from a position for the second clip array to initiate enlargement of clip pitch thereof, and enlarging clip pitches of the first and second clip arrays along with travel movements of the first and second clip arrays to thereby make an oblique stretch of the sheet or film.

According to a second aspect of the present invention, a sheet or film oblique stretching method comprises clipping moving-directionally right and left side edge parts of a sheet or film by first and second clip arrays composed of pitch-variable clips having clip pitches in a moving direction of the sheet or film variable along with travel movements thereof, having, with respect to the moving direction of the sheet or film, a factor of enlargement of clip pitch of the first clip array along with travel movement of the first clip array changed from a factor of enlargement of clip pitch of the second clip array along with travel movement of the second clip array, and enlarging clip pitches of the first and second clip arrays along with travel movements of the first and second clip arrays to thereby make an oblique stretch of the sheet or film.

According to a third aspect of the present invention, a sheet or film clipping stretcher comprises first and second clip arrays composed of pitch-variable clips having clip pitches in a moving direction of a sheet or film variable along with travel movements thereof, and configured to clip moving-directionally right and left side edge parts of the sheet or film, and first and second clip array circulators line-symmetrically arranged on a plane, and configured to circulate the first and second clip arrays along prescribed routes, respectively, the prescribed routes being routes having, with respect to the moving direction of the sheet or film, a position for the first clip array to initiate enlargement of clip pitch thereof changed from a position for the second clip array to initiate enlargement of clip pitch thereof.

According to a fourth aspect of the present invention, a sheet or film clipping stretcher comprises first and second clip arrays composed of pitch-variable clips having clip pitches in a moving direction of a sheet or film variable along with travel movements thereof, and configured to clip moving-directionally right and left side edge parts of the sheet or film, and first and second clip array circulators line-symmetrically arranged on a plane, and configured to circulate the first and second clip arrays along prescribed routes, respectively, the prescribed routes having, with respect to the moving direction of the sheet or film, an interval for a factor of enlargement of clip pitch of the first clip array along with travel movement of the first clip array to be changed from a factor of enlargement of clip pitch of the second clip array along with travel movement of the second clip array.

BEST MODE FOR CARRYING OUT THE INVENTION

There will be described an embodiment of a sheet or film clipping stretcher according, to the present invention, with reference to FIG. 1 to FIG. 5.

Figure 1:
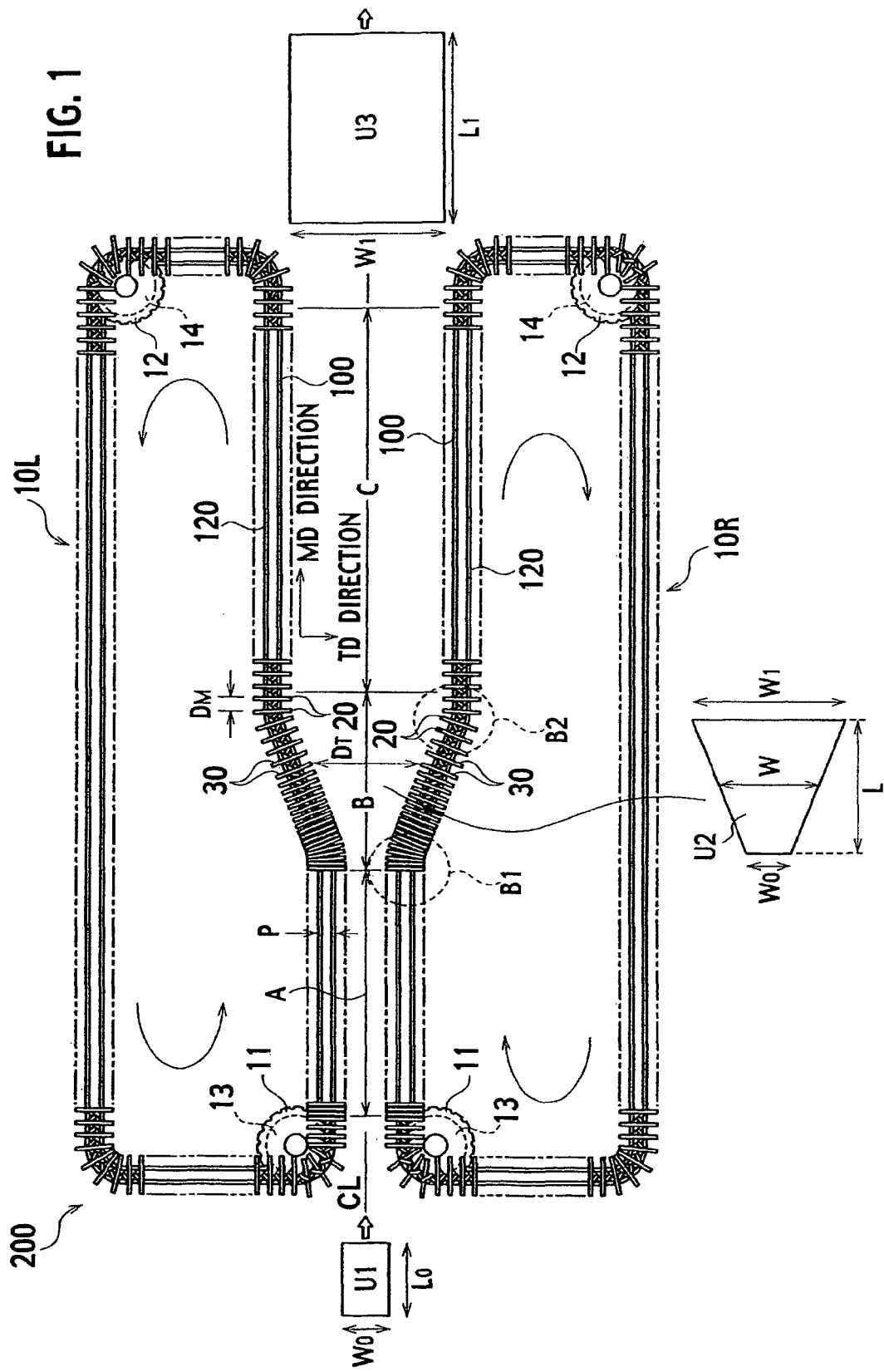
FIG. 1 is a plan view of an entire configuration of a sheet or film clipping stretcher according to an embodiment of the present invention.

Description is now made of an entire configuration of a sheet or film clipping stretcher according to the present embodiment with reference to FIG. 1.

The sheet or film clipping stretcher 200 includes endless loops 10R and 10L that have multiplicities of clips 20 configured to clip a sheet or film. The endless loops 10R and 10L are arranged to be line-symmetric about a line CL on a plane as illustrated in FIG. 1, which line can be set arbitrarily on the plane. It is noted that in view of an inlet end of sheet or film S (the left end in FIG. 1), that endless loop residing on the right side is referred herein to the endless loop 10R, and that endless loop residing on the left side, to the endless loop 10L.

The endless loops 10R and 10L have their sets of clips 20 guided by reference rails 100 to circulate in a looping manner. As illustrated in FIG. 1, for endless loop 10R, the circulation is clockwise, and for endless Loop 10L, the circulation is counterclockwise.

A preheating zone A, a stretching zone B, and a heat-treating zone C are configured in this order from the inlet end of sheet or film S to an outlet end (the right end in FIG. 1).

It is noted that in FIG. 1, designated by a quadrilateral U1 is part of sheet or film S before its transverse stretch (that is, in the preheating zone A). And, quadrilaterals U2 and U3 depict how the quadrilateral U1 is deformed, when passing through the stretching zone B (in flow-directional and transverse stretch) and the heat-treating zone C (after flow-directional and transverse stretch), respectively.

It is now assumed that the quadrilateral U1 has a transverse (TD) dimension $W_0$ identical to a transverse size of sheet or film S, and the quadrilateral U3 has a transverse (TD) dimension $W_1$ identical to a transverse size of sheet or film S after flow-directional and transverse stretch. Further, the quadrilateral U1 has a flow-directional (MD) dimension $L_0$, which is assumed to develop to $L_1$ after flow-directional and transverse stretch (that is, in the quadrilateral U3). By such settings, it so follows that, as the quadrilateral U1 passes through the stretching zone B, this quadrilateral U1 (that is, the quadrilateral U2) has a transverse dimension W, and a flow-directional dimension L, meeting inequality expressions, such that $W_0 \leq W \leq W_1$, and $L_0 \leq L \leq L_1$, respectively.

There will be describe below stretching sheet or film S under such the assumption, and by applying dimensions of quadrilaterals U1, U2, and U3 to description of flow-directional and transverse sizes of sheet or film S, for easier comprehension.

In the preheating zone A, the endless loops 10R and 10L have a spacing distance $D_T$ corresponding to a transverse width $W_0$ of sheet or film S before transverse stretch, and the endless loops 10R and 10L are arranged in parallel with the width $W_0$ kept as it is over the entire region.

In the stretching zone B, the endless loops 10R and 10L have a gradually increased spacing distance $D_T$, as they extend from the preheating zone A toward the heat-treating zone C, while the endless loops 10R and 10L are subject to a non-parallel arrangement. For the endless loops 10R and 10L in the stretching zone B, the spacing distance $D_T$ is varied, becoming correspondent to the transverse width $W_0$ of sheet or film S before transverse stretch at a stretch initiating end (as a connected end to the preheating zone A), and correspondent to a transverse width $W_1$ of sheet or film S stretched transversely finally at a stretch completing end (as a connected end to the heat-treating zone C).

In the heat-treating zone C, the endless loops 10R and 10L have a spacing distance corresponding to the transverse width $W_1$ of sheet or film S stretched transversely finally, and the endless loops 10R and 10L are arranged in parallel, with the width $W_1$ kept as it is over the entire region.

Description is now made of details of configuration of the sheet or film clipping stretcher 200 according to the present embodiment, with reference to FIG. 2 to FIG. 5.

The right and left endless loops 10R and 10L each have a number of clips 20, of which a respective one is mounted on one longitudinal end part (at the front) of a clip support member 30 rectangular in shape. It is noted that for each of clips 20 of the right endless loop 10R (as clips on the right side) and clips 20 of the left endless loop 10L (as clips on the left side), employed is a pitch-variable type adapted for a flow-directional clip pitch (as clip MD pitch) to be variable along with movement by travel.

The clip 20 is configured for a clipping of sheet or film S in a releasably gripping manner, with a yoke-shaped clip body 21, a stationary lower clip member 22 fixedly attached to the clip body 21, a movable lever 24 rotatably attached to the clip body 21 by a pin 23, and a movable upper clip member 26 swingably attached to a lower end of the movable lever 24 by a pin 25. And, the clip 20 is adapted to clip a side edge of sheet or film S in a pinching manner by combination of the stationary lower clip member 22, and the movable upper clip member 26.

For the number of clips 20, there is a set of clip support members 30 identical in number thereto, of which a respective one is adapted to individually support a clip 20. The clip support member 30 is configured as a rigid frame structure enclosed in a section (refer to FIG. 4 and FIG. 5) with a front wall 37, a rear wall 38, an upper beam 35, and a lower beam 36. At both ends (the front wall, 37 and the rear wall 38) of the clip support-member 30, there are travel wheels 33 and 34 rotatably supported by axles 31 and 32, respectively. The travel wheels 33 and 34 are adapted to roll on horizontal travel roadbeds 111 and 112 formed on a base 110. The travel roadbeds 111 and 112 are parallel to a reference rail 110, along the length.

At far end sides (read sides) of the upper beam 35 and the lower beam 36 of each clip support member 30, there are longitudinal elongate holes (as elongate bores) 39 formed therein. The upper and lower elongate holes 39 have sliders 40 respectively engaged therewith and slidable in longitudinal directions of the elongate holes 39.

In a vicinity of one end part (on the clip 20 side) of each clip support member 30, there is a single first shaft member 51 vertically provided through the upper beam 35 and the lower beam 36. The upper and lower sliders 40 of each clip support member 30 have a single second shaft member 52 vertically provided therethrough.

To the first shaft member 51 of each clip support member 30, one end of a main link member 53 is pivotally connected. The other end of the main link member 53 is pivotally connected to the second shaft member 52 of a neighboring clip support member 30.

To the first shaft member 51 of each clip support member 30, one end of a sub-link member 54 is pivotally connected, in addition to the main link member 53. The sub-link member 54 is pivotally connected at the other end to an intermediate part of the main link member 53, by a pivot shaft 55.

Figure 2:
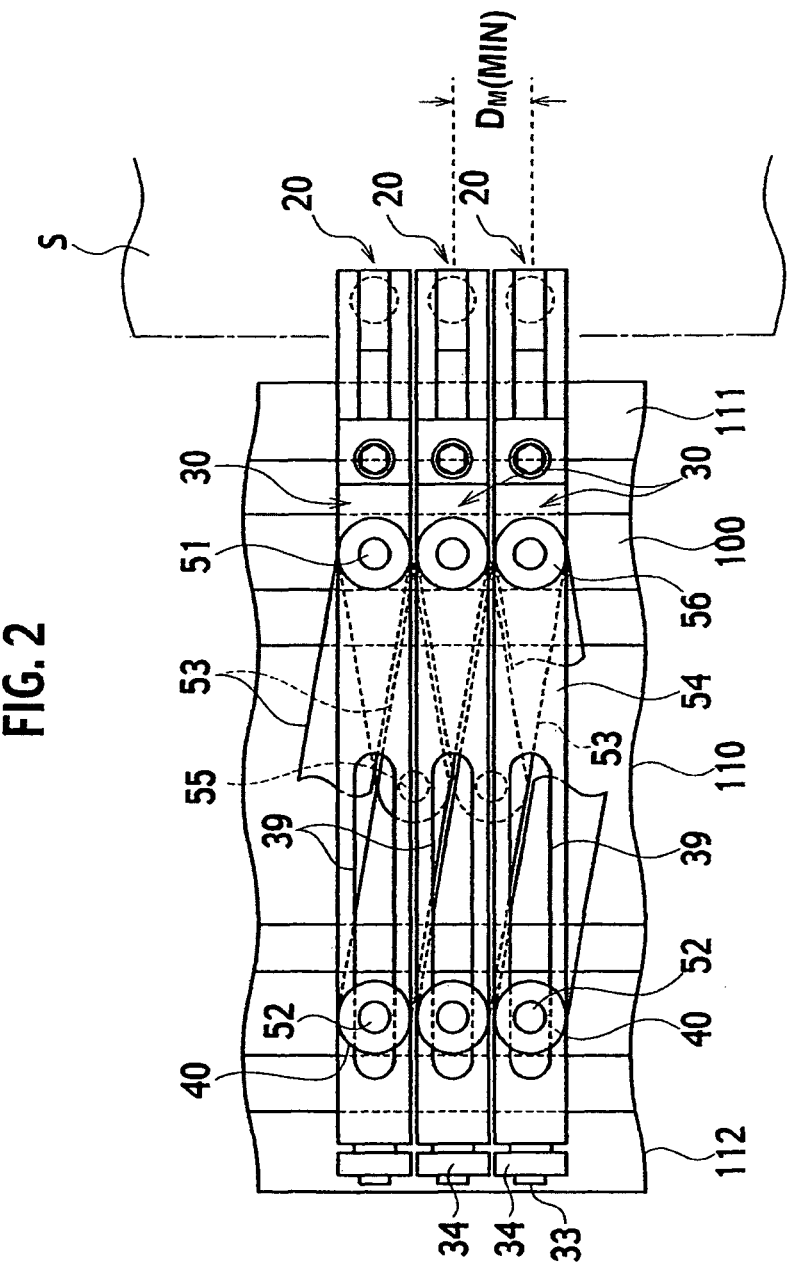
FIG. 2 is a plan view of essential parts of the sheet or film clipping stretcher in a minimal pitch state according to the embodiment.
Figure 3:
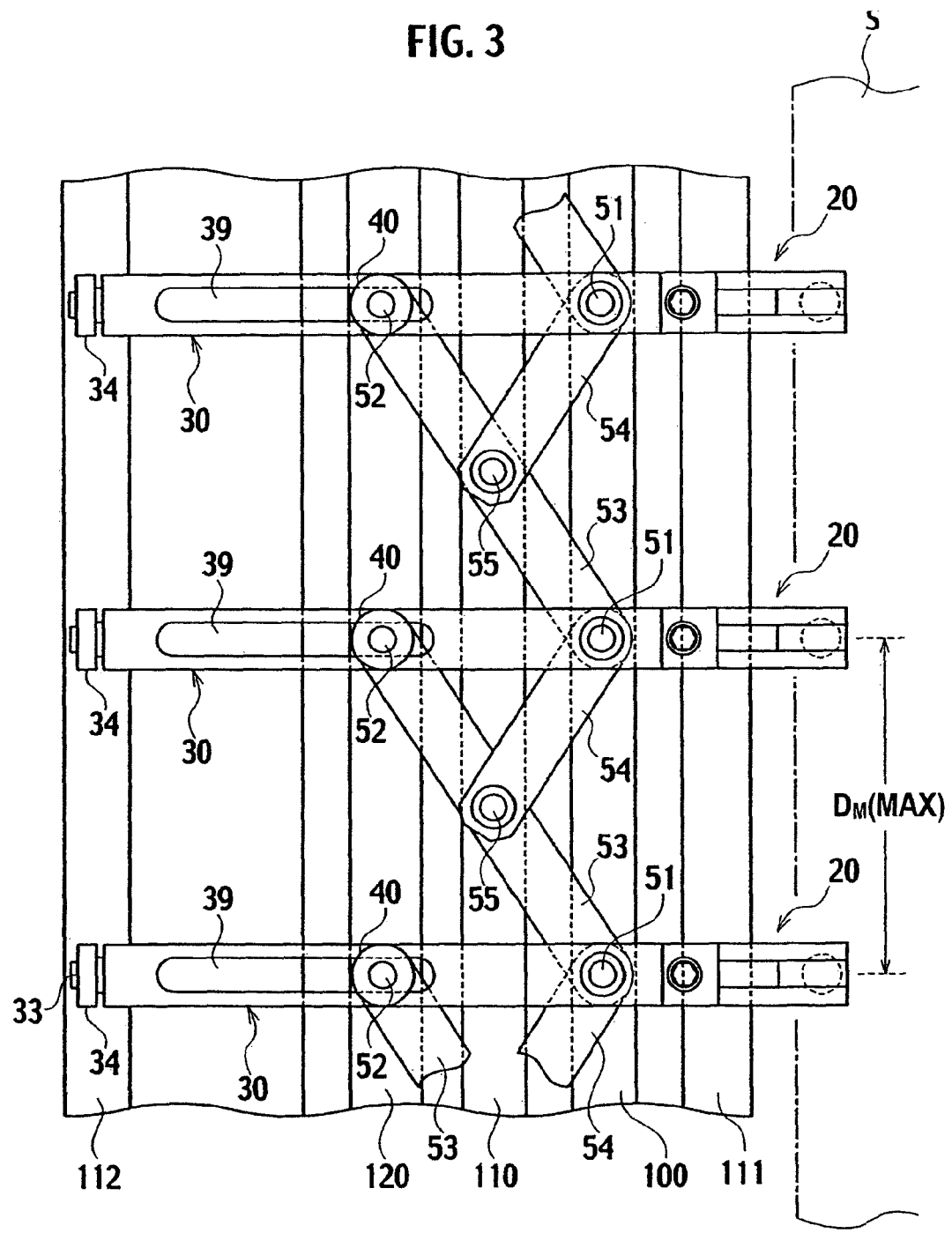
FIG. 3 is a plan view of essential parts of the sheet or film clipping stretcher in a maximal pitch state according to the embodiment.

Main link members 53 and sub-link members 54 constitute linkages, whereby as illustrated in FIG. 2, the farther their sliders 40 go toward the far ends of clip support members 30 (opposite to the clips) the smaller those pitches (clip MD pitches) $D_M$ that neighboring clip support members 30 have therebetween become, and as illustrated in FIG. 3, the more their sliders 40 come up toward the one ends of clip support members 30 (toward the clips) the greater those pitches $D_M$ that neighboring clip support members 30 have therebetween become.

It is noted that in the present embodiment, neighboring clip support members 30 have a minimal pitch $D_M(MIN)$ therebetween established by the neighboring clip support members 30 contacting each other, as illustrated in FIG. 2, and neighboring clip support members 30 have a maximal pitch $D_M(MAX)$ therebetween established by sliders 40 arriving at stroke end parts at the one end sides (the clip sides) of the clip support members 30.

The first shaft member 51 has guide rollers (as engaging elements) 56 rotatably provided on a lower end thereof. The guide rollers 56 are engaged with a recessed channel 101 of the reference rail 100 provided on the base 110 to define a circulation route of clips 20. The first shaft member 51 has a driving roller 58 rotatably provided on an upper end thereof.

The driving, roller 58 is configured to engage with drive sprockets 11 and 12 (refer to FIG. 1) in a selective manner to have a respective clip support member 30 travel along the circulation route. In other words, the drive sprockets 11 and 12 are adapted to selectively engage with the driving roller 58 of a respective clip support member 30, and are driven to rotate by electric motors 13 and 14 (refer to FIG. 1) to provide each clip support member 30 with forces to have the clip support member 30 travel along the circulation route.

The second shaft member 52 has pitch setting rollers (as engaging elements) 57 rotatably provided on a lower end thereof. The pitch setting rollers 57 are engaged with a recessed channel 121 of a pitch setting rail 120 provided on the base 110, along with the reference rail 100, for the sliders 40 to be set in position in the elongate holes 39.

The pitch setting rail 120 works for sliders 40 to be set in position in elongate holes 39 depending on a spacing distance P thereof relative to the reference rail 100, to thereby set pitches $D_M$ between neighboring clip support members 30 in a variable manner. By the pitch setting rail 120, the longer the spacing distance P relative to the reference rail 100 becomes (that is, the farther it is spaced off the reference rail 100) the farther sliders 40 are forced to go toward the far ends of clip support members 30 (opposite to the clips), rendering the smaller pitches $D_M$ between neighboring clip support members 30, and the shorter the spacing distance P relative to the reference rail 100 becomes (that is, the nearer it comes up to the reference rail 100) the more sliders 40 are forced to come up toward the one ends of clip support members 30 (toward the clips), rendering the greater pitches $D_M$ between neighboring clip support members 30.

Figure 4:
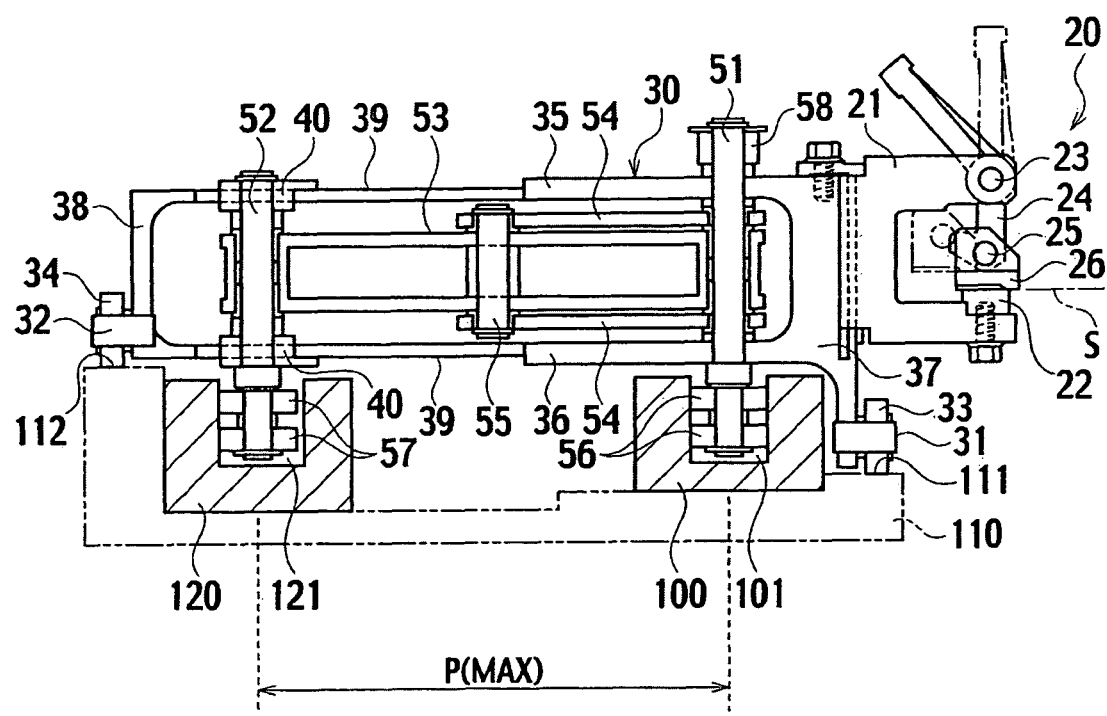
FIG. 4 is a side view of essential parts of the sheet or film clipping stretcher in the minimal pitch state according to the embodiment.
Figure 5:
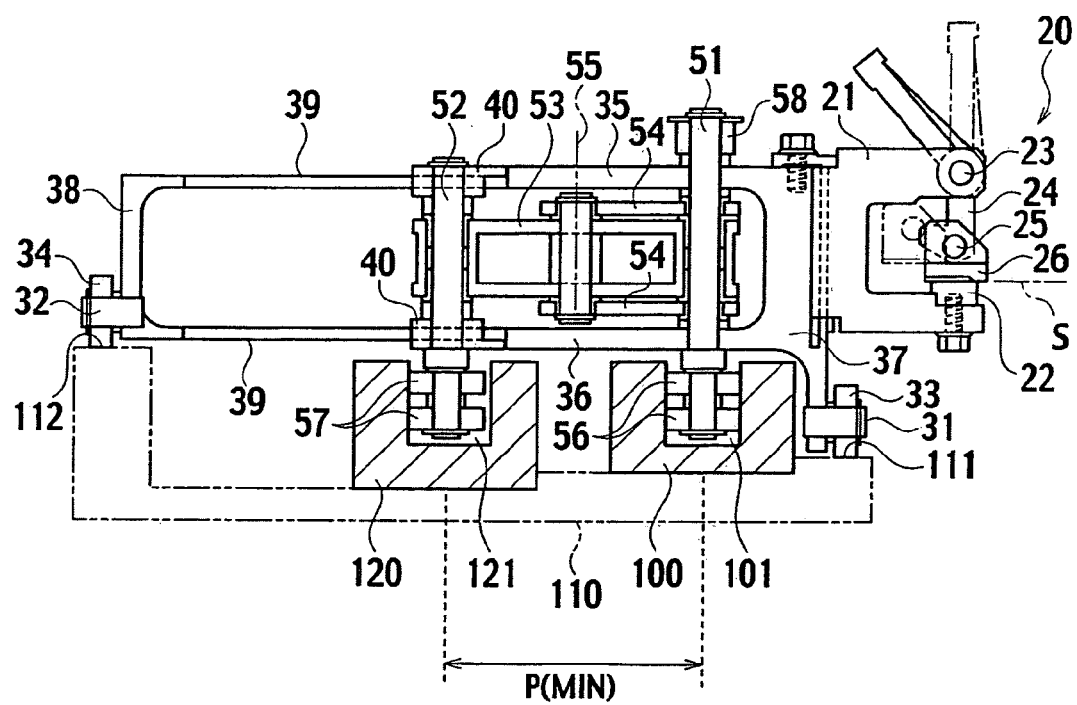
FIG. 5 is a side view of essential parts of the sheet or film clipping stretcher in the maximal pitch state according to the embodiment.

Description is now made of the pitch setting rail 120, with reference to FIG. 4 and FIG. 5. In the preheating zone A, as illustrated in FIG. 4, the spacing distance P between pitch setting rail 120 and reference rail 100 is set to a maximal value (P (MAX)) over the entire region. In this situation, between neighboring clip support members 30, the pitch $D_M$ is set to a minimal value $D_M(MIN)$.

In the stretching zone B, the spacing distanced between pitch setting rail 120 and reference rail 100 gradually becomes shorter, as they extend from the stretch initiating end (as the connected end to the preheating zone A), where it has, the maximal value (P (MAX)), to the stretch completing end, where it has a minimal value P (MIN).

In the heat-treating zone C, as illustrated in FIG. 5, the spacing distance P between pitch setting rail 120 and reference rail 100 is set to the minimal value (P (MIN)) over the entire region. In this situation, between neighboring clip support members 30, the pitch $D_M$ is set to a maximal value $D_M(MAX)$.

Description is now made of functions of the sheet or film clipping stretcher 200 according to the present embodiment.

For the right endless loop 10R, the drive sprockets 11 and 12 are driven to rotate clockwise by the electric motors 13 and 14, and for the left endless loop 10L, the drive sprockets 11 and 12 are driven to rotate counterclockwise by the electric motors 13 and 14. And, those clip support members 30 of which driving rollers 58 are engaged with the drive sprockets 11 and 12 are given forces to travel. The endless loop 10R is thereby forced to go round clockwise, and the endless loop 10L, to go round counterclockwise, whereby sheet or film S is taken in between the endless loops 10R and 10L at the left end in FIG. 1.

At an opening for sheet or film S to be taken in, both side edges of sheet or film are clipped (clip on) by clips 20 of the endless loops 10R and 10L, and the sheet or film S first enters the preheating zone A, as the endless loops 10R and 10L move, that is, as clip support members 30 are guided to travel by reference rails 100.

In the preheating zone A, the spacing, distance DT between endless loops 10R and 10L is kept as it is correspondent to a transverse width $W_0$ before transverse stretch, the endless-loops 10R and 10L being arranged parallel to each other over the entire region. And, the spacing distance P between pitch setting rail 120 and reference rail 100 is set to a maximal value P (MAX) uniformly over the entire region. Accordingly, in the preheating zone A, simply a preheating is performed, and neither flow-directional stretch nor transverse stretch of sheet or film S is performed.

Next, the sheet or film S enters the stretching zone B. In the stretching zone B, the endless loops 10R and 10L have a gradually increasing spacing distance $D_T$, as they move from the preheating zone A toward the heat-treating zone C. Further, the spacing distance P between pitch setting rail 120 and reference rail 100 becomes gradually shorter (P (MAX)→P (MIN)), as they extend from the preheating zone A toward the heat-treating zone C. Accordingly, sliders 40 are displaced toward the one ends (toward clips) of clip support members

30, having gradually increased pitches $D_M$ between neighboring clip support members 30. By that, in the stretching zone B, both flow-directional stretch and transverse stretch of sheet or film S are performed simultaneously.

After that, the sheet or film S enters the heat-treating zone C. In the heat-treating zone C, the spacing distance $D_T$ between endless loops 10R and 10L is kept as it is correspondent to a transverse width $W_1$ after transverse stretch, the endless loops 10R and 10L being arranged parallel to each other over the entire region. And, the spacing distance P between pitch setting rail 120 and reference rail 100 is set to a minimal value P (N) uniformly over the entire region. Accordingly, in the heat-treating zone C, simply a heat treatment such as temperature control is performed, and neither flow-directional stretch nor transverse stretch of sheet or film S is performed.

At an outlet of the heat-treating zone C, the sheet or film is released (clip off) from the clipping by clips 20 of the endless loops 10R and 10L, and, the sheet or film goes straight ahead, while clip support members 30 are guided by reference rails 30 to circulate in a looping manner.

Figure 6:
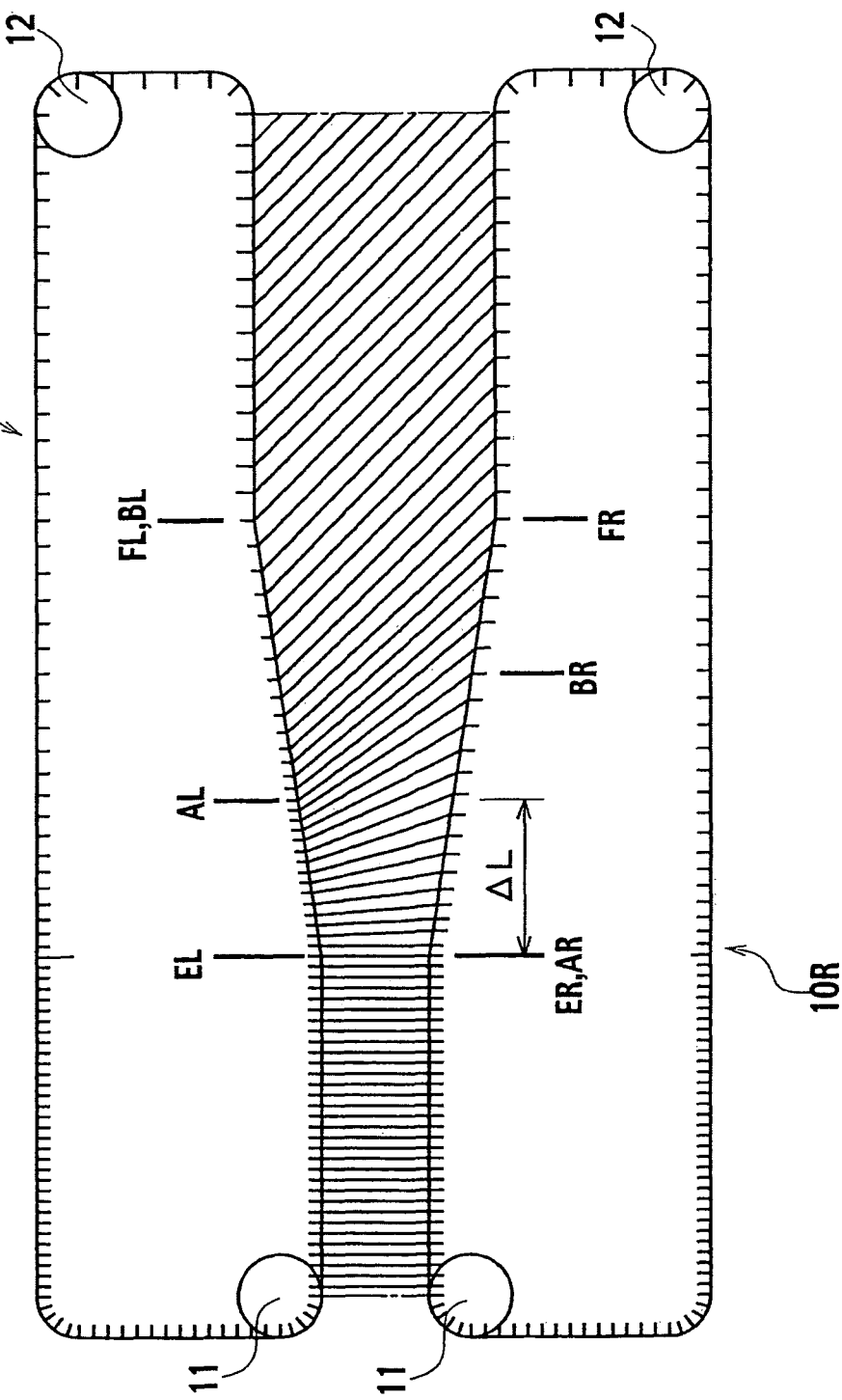
FIG. 6 is a plan of entirety illustrating an oblique stretch by sheet or film clipping stretcher according to an embodiment of the present invention.

For an oblique stretch to be made, as illustrated in FIG. 6, there is given a difference $\Delta L$ in the moving direction of sheet or film between a position AR set for clips 20 of the right endless loop 10R to initiate an enlargement of the flow-directional clip pitch and a position AL set for clips 20 of the left endless loop 10L to initiate an enlargement of the flow-directional clip pitch.

It is now assumed that for the oblique stretch to be at an angle (as orientation angle) of 45 degrees, the difference $\Delta L$ is given such that $\Delta L$=(film width at stretch outlet)×(flow-directional clip pitch in initial phase before stretch)/{(flow-directional clip pitch upon completion of stretch)−(flow-directional clip pitch in initial phase before stretch)}.

By that, subject to a uniform speed driving of the right and left endless loops 10R and 10L, the flow-directional clip pitches increase as clips 20 travel to move, thereby making a flow-directional stretch, while effecting an oblique stretch.

It is noted that there are set identical values to a distance between the position AR for clips 20 of the right endless loop 10R to initiate an enlargement of flow-directional clip pitch and a position BR to complete the enlargement, and a distance between the position AL for clips 20 of the left endless loop 10L to initiate an enlargement of flow-directional clip pitch and a position BL to complete the enlargement.

It is thereby permitted to make an oblique stretch without differences developed between, among others, travel locus lengths or travel speeds of right and left clips 20, thus allowing even for a sheet or film clipping stretcher of straight-going type to implement stable production of a high-quality oblique stretched sheet or film without causing, among others, variations in orientation in a transverse direction (as TD direction) of sheet or film.

In particular, at the time of clip-on, right and left clips 20 have an even travel speed, and at the time of clip-off also, right and left clips 20 have an even travel sped whereby the gripping as well as the releasing of sheet or film is kept free of variations between right and left. By this also, it is allowed to implement stable production of a high-quality oblique stretched sheet or film.

Further, between the right and left endless loops 10R and 10L, their amounts of enlargement of flow-directional clip pitch of clips 20 may well be equalized to each other. It is thereby permitted to produce a high-quality oblique stretched sheet or film with even right and left stretch ratios. Further, the magnification of oblique stretch can be adjusted by setting enlargement amounts of clip pitches.

The enlargement amounts of clip pitches can be set arbitrarily by configuration of pitch setting rails 120, thus allowing for facile and flexible implementations of, among others, production of a high-quality oblique stretched sheet or film with even right and left stretch ratios, and adjustment of the magnification of oblique stretch.

Further, in the present embodiment, together with, the oblique stretch described, a transverse stretch is made between positions ER and EL for initiation of a transverse stretch and positions FR and FL for completion of the transverse stretch on the right and left endless loops 10R and 10L. It is thereby enabled to produce an oblique stretched sheet or film as transversely stretched, with good productivity.

Figure 7:
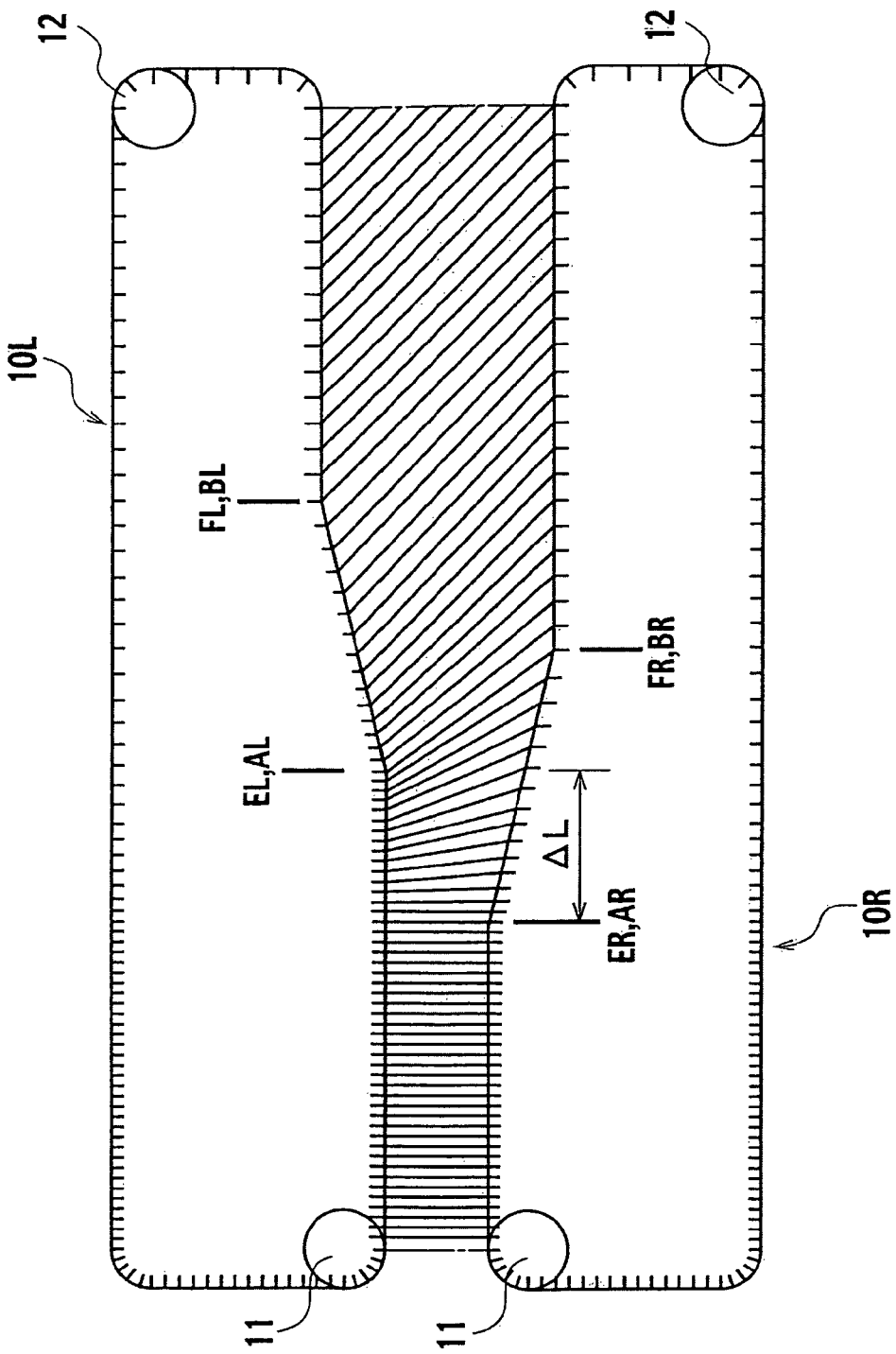
FIG. 7 is a plan of entirety illustrating an oblique stretch by sheet or film clipping stretcher according to another embodiment of the present invention.

In the present embodiment, the right and left endless loops 10R and 10L have their positions ER and EL for transverse stretch initiation and positions FR and FL for transverse stretch completion on locations identical to each other with respect to the moving direction of sheet or film, whereas like an embodiment illustrate in FIG. 7, positions ER and EL for transverse stretch initiation and positions FR and FL for transverse stretch completion of right and left endless loops 10R and 10L may be set apart from each other respectively by an equivalent difference $\Delta L$ in a moving direction of sheet or film, to that between a position AR for initiation of flow-directional clip pitch enlargement of clips 20 of the right endless loop 10R and a position AL for initiation of flow-directional clip pitch enlargement of clips 20 of the left endless loop 10L.

In this case, the right and left endless loops 10R and 10L have an interval for oblique stretch (as interval for flow-directional stretch) and an interval for transverse stretch identical to each other in the moving direction of sheet or film.

Figure 8:
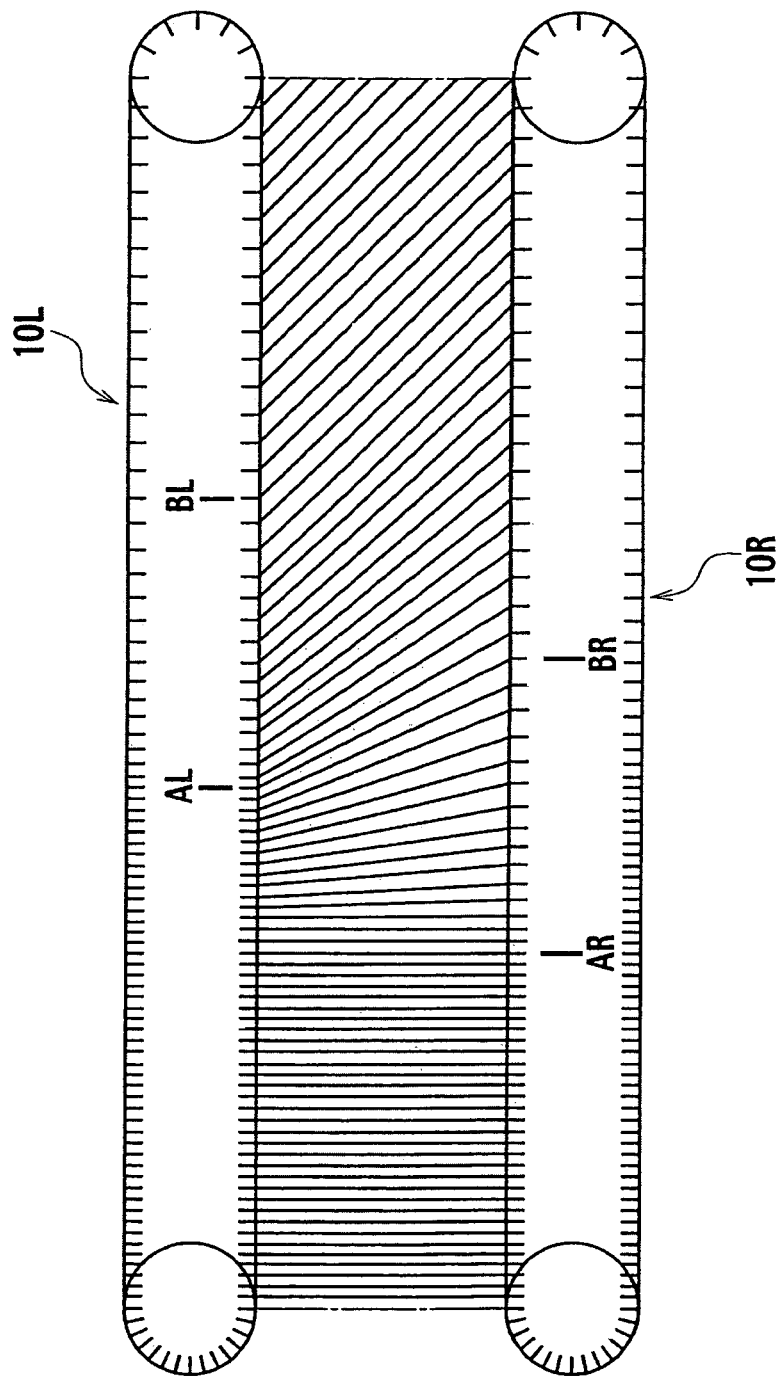
FIG. 8 is a plan of entirety illustrating an oblique stretch by sheet or film clipping stretcher according to another embodiment of the present invention.

For elimination of transverse stretch, like an embodiment illustrated in FIG. 8, there may be simply given a difference $\Delta L$ in a moving direction of sheet or film between a position AR for initiation of flow-directional clip pitch enlargement of clips 20 of a right endless loop 10R and a position AL for initiation of flow-directional clip pitch enlargement of clips 20 of a left endless loop 10L.

It is noted that this case may also be subject to a uniform speed driving of the right and left endless loops 10R and 10L, and have mutually identical values set to a distance between the position AR for clips 20 of the right endless loop 10R to initiate an enlargement of flow-directional clip pitch and a position BR to complete the enlargement, and a distance between the position AL for clips 20 of the left endless loop 10L to initiate an enlargement of flow-directional clip pitch and a position BL to complete the enlargement.

Figure 9:
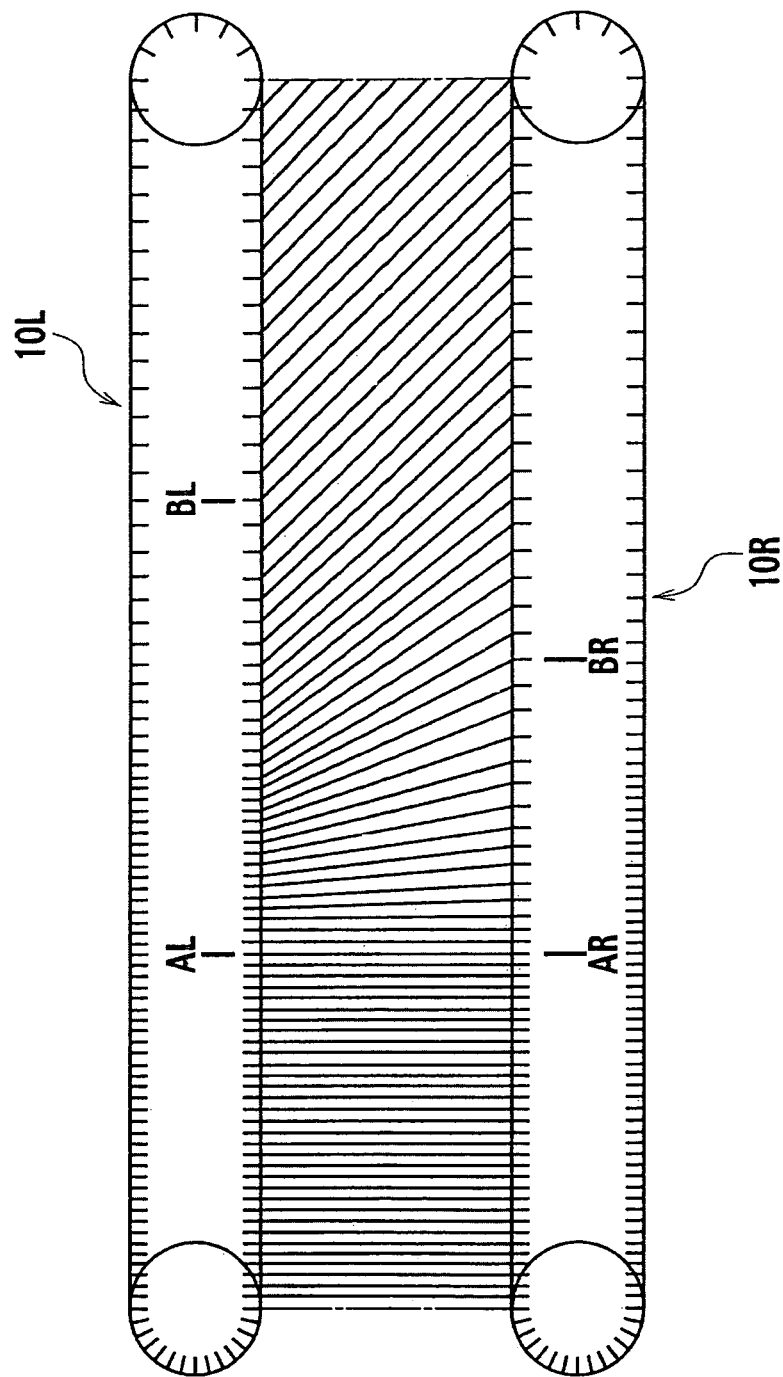
FIG. 9 is a plan of entirety illustrating an oblique stretch by, sheet or film clipping stretcher according to still another embodiment of the present invention.

Description is now made of another embodiment for oblique stretch, with reference to FIG. 9. This embodiment has different factors of enlargement set for flow-directional clip pitches of clips 20 (as amounts of enlargement in flow-directional clip pitch per unit amount of movement), between the right endless loop 10R and the left endless loop 10L. In this embodiment, the right endless loop 10R has a factor of enlargement of flow-directional clip pitch greater than a factor of enlargement of flow-directional clip pitch of the left endless loop 10L.

Such being the case, between right endless loop 10R and left endless loop 10L, enlargement factors of flow-directional clip pitches of clips 20 are changed, whereby also an oblique stretch can be implemented.

This embodiment may well be subject to a uniform speed driving of the right and left endless loops 10R and 10L and have mutually identical locations set in a moving direction of sheet or film, to a position AR for clips 20 of the right endless loop 10R to initiate an enlargement of flow-directional clip pitch, and a position AL for clips 20 of the left endless loop 10L to initiate an enlargement of flow-directional clip pitch.

For production of an oblique stretched sheet or film with, equalized right and left stretch ratios under that setting, as it is desirable, there may well be a distance set between the position AR for clips 20 of the right endless loop 10R to initiate an enlargement of flow-directional clip pitch and a position BR to complete the enlargement, to be longer than a distance between the position AL for clips 20 of the left endless loop 10L to initiate an enlargement of flow-directional clip pitch and a position BL to complete the enlargement, in order for flow-directional clip pitches of right and left clips 20 to have equalized values upon completion of flow-directional stretch.

This embodiment also permits an oblique stretch to be made without developed differences between travel locus lengths of right and left clips 20, thus allowing even for a sheet or film stretcher of straight-going type to implement stable production of a high-quality oblique stretched sheet or film without causing, among others, variations in orientation in a transverse direction (as TD direction) of sheet or film. Further, at the time of clip-on, right and left clips 20 have an even travel speed, and at the time of clip-off also, right and left clips 20 have an even travel speed, whereby the gripping as well as the releasing of sheet or film is kept free of variations between right and left. By this also, it is allowed to implement stable production of a high-quality oblique stretched sheet or film.

It is noted that in this embodiment also, like transverse stretch to the embodiment illustrated in FIG. 6 or FIG. 7 may well be made together, and further, for an oblique stretch to be made, there may well be a combination with a difference given in a moving direction of sheet or film between positions for clips 20 to initiate enlargement of flow directional clip pitch in right clips 20 and left clips 20.

INDUSTRIAL APPLICABILITY

As will be seen from the foregoing description, according to the present invention, in a sheet or film oblique stretching method, flow-directional clip pitches are enlarged along with travel movements to thereby perform a flow-directional stretch, while having positions set for initiation of enlargement of the flow-directional clip pitches to be different in a moving direction of sheet or film between right clips and left clips, or having different ratios of enlargement in flow-directional clip pitches of right and left clips, to thereby make an oblique stretch, thus allowing for implementation of an oblique stretch without developed differences between travel locus lengths of right and left clips.

Further, upon a clip-on for sheet or film to be gripped as well as upon a clip-off for sheet or film to be released, travel speeds of clips can be equalized, thus permitting the gripping of sheet or film to be kept free of variations between right and left. By those matters, it is allowed to implement stable production of a high-quality oblique stretched sheet or film.

It is thereby allowed even for a sheet or film stretcher of straight-going type to implement stable production of a high-quality oblique stretched sheet or film without causing variations in orientation in a transverse direction (as TD direction) of sheet or film.

Further, variation amounts of flow-directional clip pitches of clips can be set to thereby adjust the magnification of an oblique stretch, allowing in addition for a transverse stretch to be effected simultaneously with the oblique stretch.

The invention claimed is:

1. A sheet or film oblique stretching method comprising:
   feeding a sheet or film to a preheating zone, a stretching zone and a heat-treating zone while keeping opposite side edge parts of the sheet or film clipped by first and second clip arrays composed of pitch-variable clips having clip pitches, each pitch being a distance between adjacent clips, in a moving direction of the sheet or film, the pitches being variable in the moving direction of the sheet or film;
   having, with respect to the moving direction of the sheet or film, a position for the first clip array to initiate enlargement of clip pitch different from a position for the second clip array to initiate enlargement of clip pitch in the stretching zone; and
   enlarging clip pitches of the first and second clip arrays along with the travel of the first and second clip arrays to thereby make an oblique stretch of the sheet or film in the stretching zone.

2. A sheet or film oblique stretching method comprising:
   feeding a sheet or film to a preheating zone, a stretching zone and a heat-treating zone while keeping opposite side edge parts of the sheet or film clipped by first and second clip arrays composed of pitch-variable clips having clip pitches, each pitch being a distance between adjacent clips, in a moving direction of the sheet or film, the pitches being variable in the moving direction of the sheet or film;
   having, with respect to the moving direction of the sheet or, film, a factor of enlargement of clip pitch of the first clip array along the travel of the first clip array different from a factor of enlargement of clip pitch of the second clip array along with the travel of the second clip array in the stretching zone; and
   enlarging clip pitches of the first and second clip arrays along the travel of the first and second clip arrays to thereby make an oblique stretch of the sheet or film in the stretching zone.

3. The sheet or film oblique stretching method according to claim 1, comprising enlarging a spacing between the first and second clip arrays along with the travel of the first and second clip arrays, to thereby make a transverse stretch of the sheet of film together with the oblique stretch.

4. The sheet or film oblique stretching method according to claim 2, comprising enlarging a spacing between the first and second clip arrays along with the travel of the first and second clip arrays, to thereby make a transverse stretch of the sheet of film together with the oblique stretch.

5. The sheet or film oblique stretching method according to claim 1, wherein the first and second clip arrays travel at a uniform speed at a time of clip-on in the preheating zone and at a time of clip off in the heat-treating zone.

6. The sheet or film oblique stretching method according to claim 2, wherein the first and second clip arrays travel at a uniform speed at a time of clip-on in the preheating zone and at a time of clip off in the heat-treating zone.

* * * * *

UNITED STATES PATENT AND TRADEMARK OFFICE
CERTIFICATE OF CORRECTION

PATENT NO. : 8,535,588 B2  Page 1 of 1
APPLICATION NO. : 12/374270
DATED : September 17, 2013
INVENTOR(S) : Sano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Fifteenth Day of September, 2015

Michelle K. Lee
*Director of the United States Patent and Trademark Office*